United States Patent
Liu

(10) Patent No.: US 9,561,759 B2
(45) Date of Patent: Feb. 7, 2017

(54) DETECTING TRANSMISSION EQUIPMENT FOR VEHICLE GAUGE

(71) Applicant: Wen-Hsien Liu, New Taipei (TW)

(72) Inventor: Wen-Hsien Liu, New Taipei (TW)

(*) Notice: Subject to any disclaimer, the term of this patent is extended or adjusted under 35 U.S.C. 154(b) by 0 days.

(21) Appl. No.: 14/834,578

(22) Filed: Aug. 25, 2015

(65) Prior Publication Data

US 2016/0297380 A1   Oct. 13, 2016

(30) Foreign Application Priority Data

Apr. 8, 2015   (TW) .............................. 104205204 U

(51) Int. Cl.
*B60Q 1/00* (2006.01)
*B60R 16/023* (2006.01)
*B60K 37/02* (2006.01)

(52) U.S. Cl.
CPC ............. *B60R 16/023* (2013.01); *B60K 37/02* (2013.01)

(58) Field of Classification Search
CPC .......................... B60R 16/0232; B60R 16/0231
USPC ................ 340/425.5, 426.18, 438, 439, 441, 449,340/450.3, 451, 539.1, 691.6, 815.78
See application file for complete search history.

(56) References Cited

U.S. PATENT DOCUMENTS

| | | | | |
|---|---|---|---|---|
| 7,421,321 B2* | 9/2008 | Breed | ................... | B60C 11/24 340/442 |
| 7,835,854 B2* | 11/2010 | Yamamoto | ......... | B60C 23/0401 340/435 |
| 2009/0043446 A1* | 2/2009 | Drew | ................... | G01C 21/00 340/438 |

* cited by examiner

*Primary Examiner* — Toan N Pham
(74) *Attorney, Agent, or Firm* — Aland D. Kamrath; Lamrath IP Lawfirm, P.A.

(57) ABSTRACT

Detecting transmission equipment for a vehicle gauge is fixed in an engine room of a vehicle and on a gauge. The detecting transmission equipment contains: a control box including: a first circuit board having a calculating module; a plurality of connecting ports, and each connecting ports being coupled with a first transmission cable; a power port welded on the first circuit board; a wireless transmission module welded on the first circuit board and coupled with the calculating module; and a receiver fixed on a gauge panel. The receiver includes a second circuit board having at least one second transmission cable connected with the gauge panel; a wireless receiving module welded on the second circuit board to receive data of the vehicle, and the data is displayed on the gauge panel via the at least one second transmission cable.

4 Claims, 3 Drawing Sheets

DETECTING TRANSMISSION EQUIPMENT FOR VEHICLE GAUGE

BACKGROUND OF THE INVENTION

Field of the Invention

The present invention relates to a vehicle gauge, and more particularly to detecting transmission equipment for the vehicle gauge which sends data in a wireless transmission manner.

Description of the Prior Art

Conventional mechanical detecting equipment is fixed in an engine of a vehicle to monitor a vehicle status, wherein the vehicle gauge is connected with the plural parts in a wired connection manner. For example, the mechanical detecting equipment is adapted to monitor an oil temperature (detecting the oil temperature), an oil pressure (detecting a pressure of engine oil), a water temperature (detecting the water temperature), a vacuum (detecting an intake pressure), a voltage (detecting the voltage), an exhaust temperature (detecting a temperature of an exhauster), and a turbo pressure (detecting a pressure).

The vehicle gauge detects the vehicle, for example, a water temperature gauge displays an increasing temperature, and an oil indicator emits warning lights when the temperature is detected extremely high. Accordingly, the vehicle gauge displays normal values and abnormal values to reminder a driver to check and maintain the vehicle, thus preventing driving danger.

The conventional vehicle gauge is fixed in a control box in an engine room and is in connection with a receiver of a gauge panel through a transmission cable, a worker has to remove a cover of the gauge panel before a driver seat and to fix the transmission cable in a suitable position, thus causing installation and removal time and cost. Furthermore, the transmission cable is made of plastic material, so it is melted or is broken easily after a period of using time and in a high temperature to have a short circuit of the transmission cable, thus produce wrong monitoring data, or burn the vehicle.

The present invention has arisen to mitigate and/or obviate the afore-described disadvantages.

SUMMARY OF THE INVENTION

The primary objective of the present invention is to provide detecting transmission equipment for a vehicle gauge which sends data in a wireless transmission manner to avoid complicated cable arrangement.

Accordingly, detecting transmission equipment for a vehicle gauge provided by the present invention is fixed in an engine room of a vehicle and on a gauge and contains: a control box accommodated in an engine room of a vehicle and including: a first circuit board, a plurality of connecting ports, a power port, a wireless transmission module, and a receiver.

The first circuit board has a calculating module.

The plurality of connecting ports are welded on the first circuit board, and each of the plurality of connecting ports is coupled with a first transmission cable which sends data of the vehicle to the calculating module.

The power port is welded on the first circuit board.

The wireless transmission module is welded on the first circuit board and is coupled with the calculating module to send the data of the vehicle which is calculated by the calculating module.

The receiver is fixed on a gauge panel and includes:

a second circuit board having at least one second transmission cable connected with the gauge panel;

a wireless receiving module welded on the second circuit board to receive the data, and the data is displayed on the gauge panel via the at least one second transmission cable.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
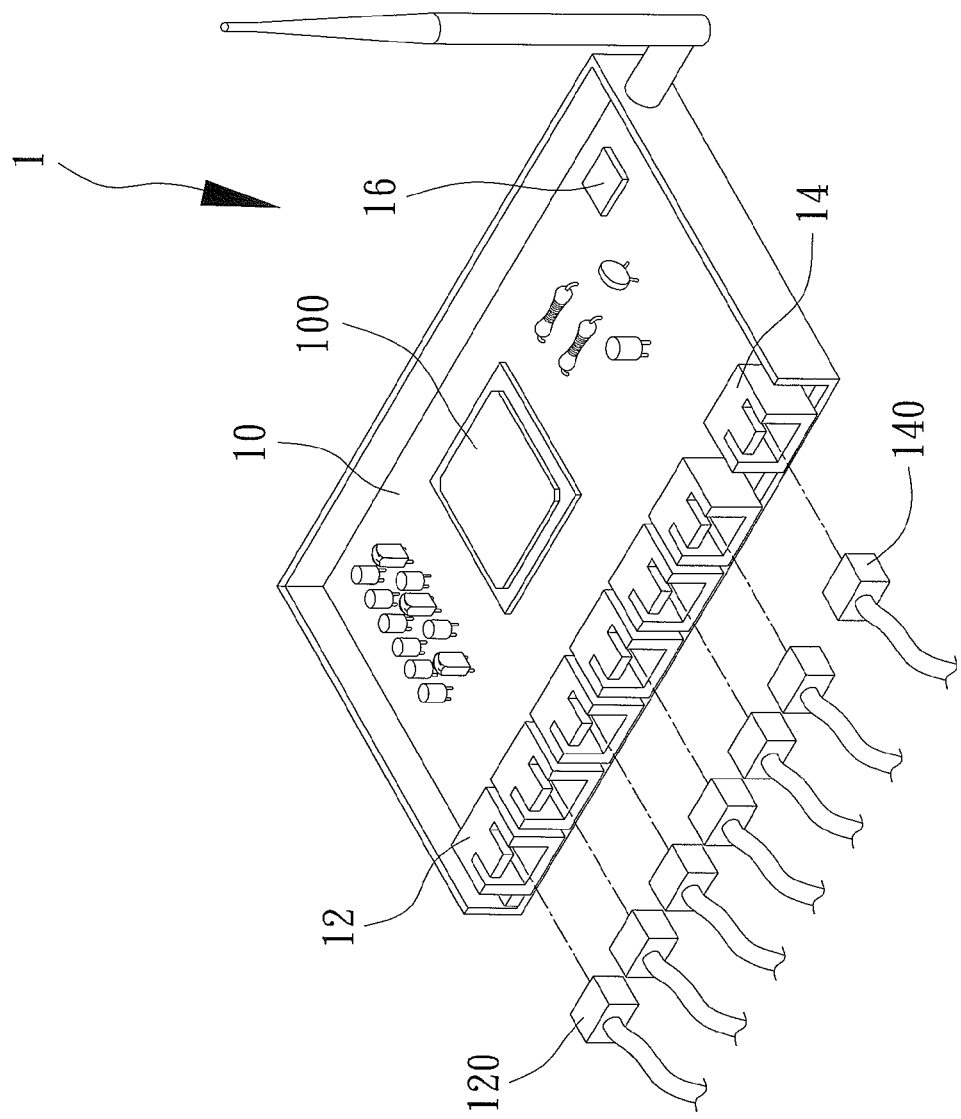
FIG. 1 is a perspective view showing the assembly of a control box of detecting transmission equipment for a vehicle gauge according to a preferred embodiment of the present invention.
Figure 2:
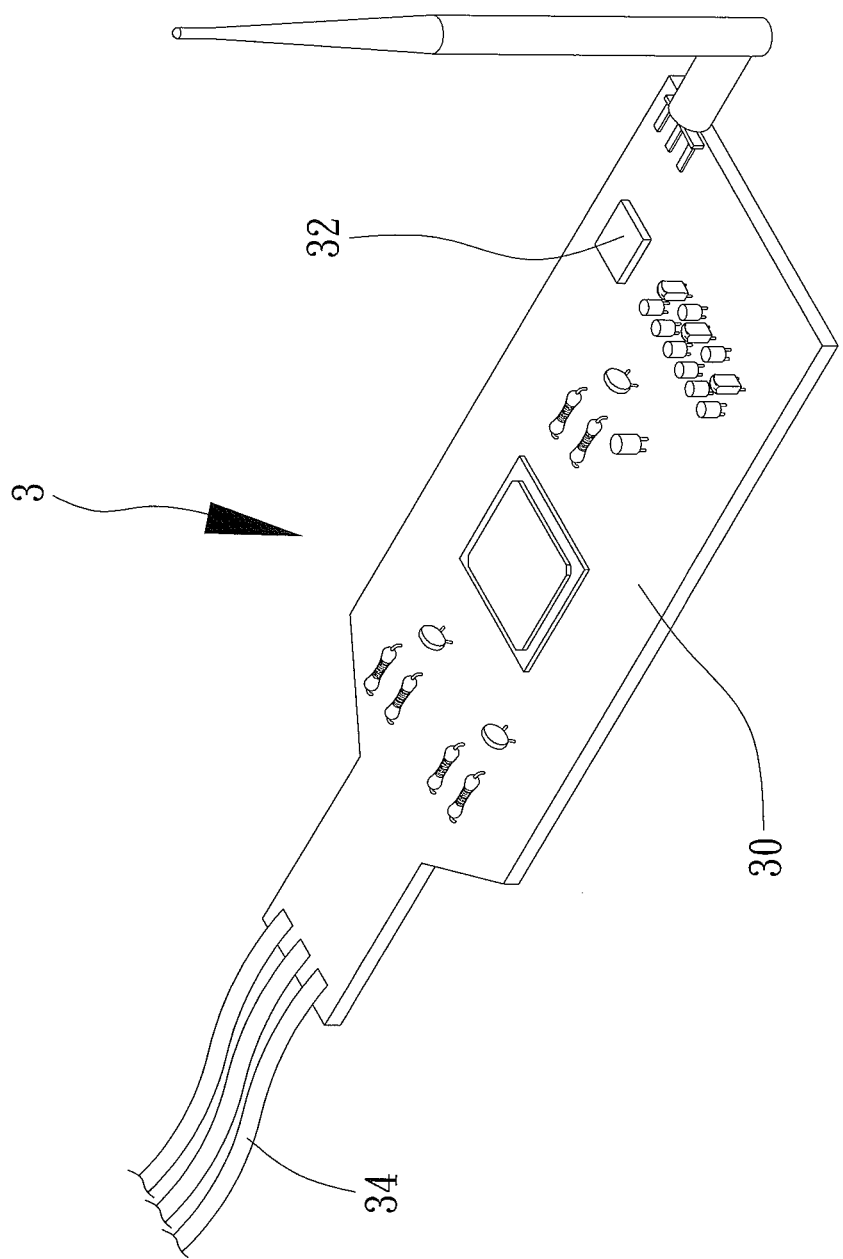
FIG. 2 is a perspective view showing the assembly of a control box of the detecting transmission equipment for the vehicle gauge according to the preferred embodiment of the present invention.

With reference to FIGS. 1 and 2, detecting transmission equipment for a vehicle gauge according to a preferred embodiment of the present invention comprises: a control box 1 accommodated in an engine room 2 of a vehicle and a receiver 3 fixed on a gauge panel 4, wherein the control box 1 includes a first circuit board 10, a plurality of connecting ports 12 welded on the first circuit board 10, a power port 14 welded on the first circuit board 10, and a wireless transmission module 16 welded on the first circuit board 10; the receiver 3 includes a second circuit board 30 and a wireless receiving module 32 welded on the second circuit board 30. The wireless transmission module 16 and the wireless receiving module 32 send data in a bluetooth transmission manner, so they contact with each other (as indicated by a dotted arrow line of FIG. 3) before sending the data, and the wireless transmission module 16 send the data to the wireless receiving module 32 in a wireless transmission manner.

Figure 3:
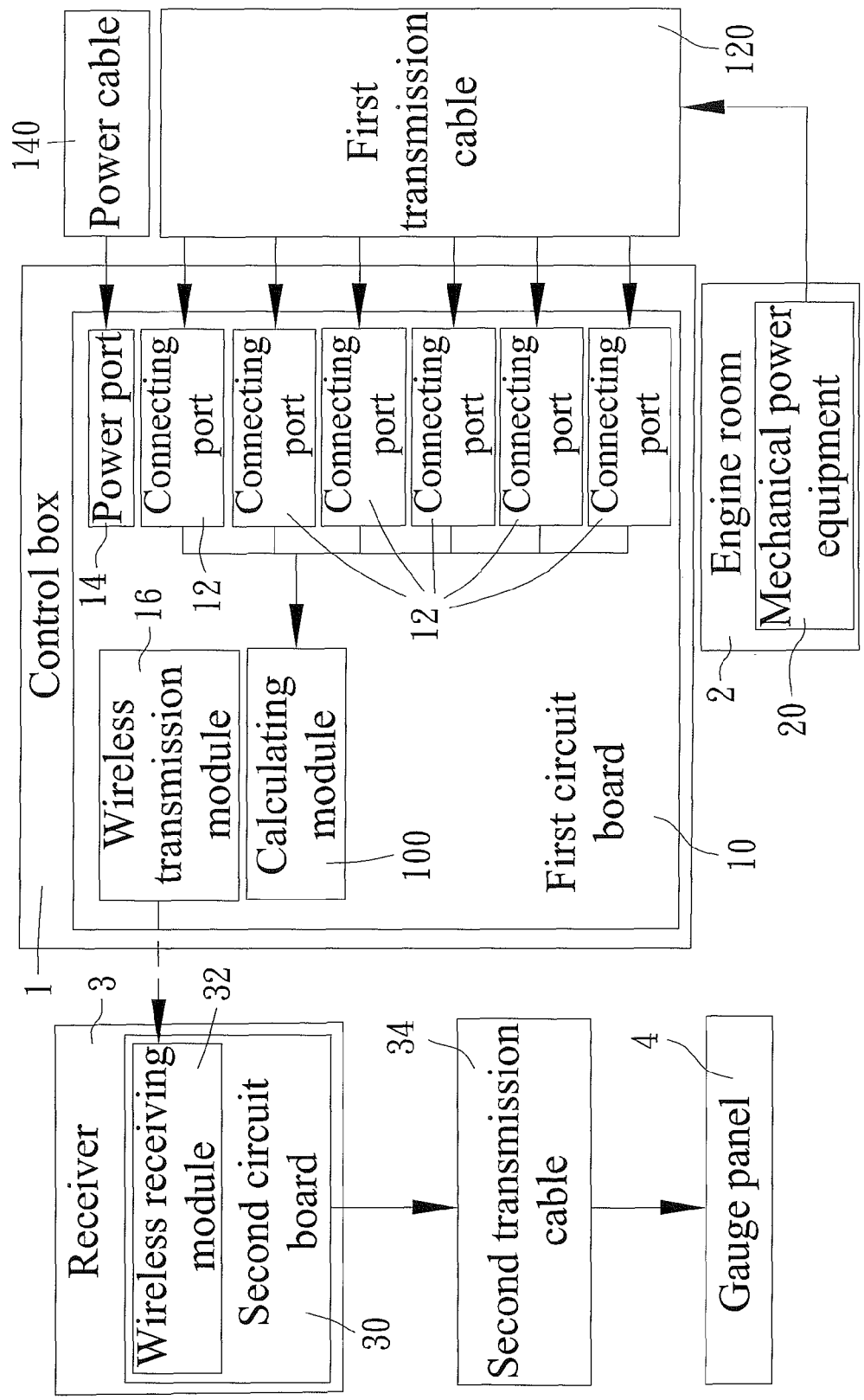
FIG. 3 is a block diagram of the detecting transmission equipment for the vehicle gauge according to the preferred embodiment of the present invention.

Referring to FIG. 3, the first circuit board 10 of the control box 1 has a calculating module 100, and the power port 14 is in connection with a storage battery via a power cable 140 to supply power to the detecting transmission equipment. Each of the plurality of connecting ports 12 is coupled with a first transmission cable 120 which connects with each mechanical power equipment 20 in the engine room 2 to monitor the data of the vehicle, such as an oil temperature (detecting the oil temperature), an oil pressure (detecting a pressure of engine oil), a vacuum (detecting an intake pressure), a voltage (detecting the voltage), an exhaust temperature (detecting a temperature of an exhauster), and a turbo pressure (detecting a pressure). The first transmission cable 120 selectively connects with above-mentioned equipment and acquires related data, and the data is analyzed and converted by the calculating module 100, thereafter the data is transmitted to a corresponding device by using the wireless transmission module 16.

The wireless receiving module 32 of the receiver 3 receives the data. Because the second circuit board 30 connects with the gauge panel 4 via at least one second transmission cable 34, the data is displayed on the gauge panel 4 for driver's judgment.

Thereby, the wireless transmission module 16 of the control box 1 and the wireless receiving module 32 of the receiver 3 transmit the oil temperature (detecting the oil temperature), the oil pressure (detecting the pressure of engine oil), a water temperature (detecting the water temperature), the vacuum (detecting the intake pressure), the voltage (detecting the voltage), the exhaust temperature (detecting the temperature of the exhauster), and the turbo pressure (detecting the pressure) to avoid complicated cable arrangement.

While we have shown and described various embodiments in accordance with the present invention, it is clear to those skilled in the art that further embodiments may be made without departing from the scope of the present invention.

What is claimed is:

1. Detecting transmission equipment for a vehicle gauge being fixed in an engine room of a vehicle and on a gauge and comprising:
   a control box accommodated in an engine room of a vehicle and including:
   a first circuit board having a calculating module;
   a plurality of connecting ports welded on the first circuit board, and each of the plurality of connecting ports being coupled with a first transmission cable which sends data of the vehicle to the calculating module;
   a power port welded on the first circuit board;
   at least one wireless transmission module welded on the first circuit board and coupled with the calculating module to send the data of the vehicle which is calculated by the calculating module; and
   a receiver fixed on a gauge panel and including:
   a second circuit board having at least one second transmission cable connected with the gauge panel;
   a wireless receiving module welded on the second circuit board to receive the data, and the data is displayed on the gauge panel via the at least one second transmission cable.

2. The detecting transmission equipment for a vehicle gauge as claimed in claim 1, wherein the wireless transmission module sends the data in a bluetooth transmission manner.

3. The detecting transmission equipment for a vehicle gauge as claimed in claim 1, wherein the wireless receiving module receives the data in a bluetooth transmission manner.

4. The detecting transmission equipment for a vehicle gauge as claimed in claim 1, wherein the data of the vehicle contains an oil temperature, an oil pressure, a vacuum, a voltage, an exhaust temperature, and a turbo pressure.

* * * * *